United States Patent
Kamizono et al.

(10) Patent No.: US 8,927,142 B2
(45) Date of Patent: Jan. 6, 2015

(54) ELECTROCHEMICAL DEVICE USING MAGNESIUM ELEMENT-CONTAINING NEGATIVE ELECTRODE

(71) Applicant: Aisin Seiki Kabushiki Kaisha, Kariya-shi (JP)

(72) Inventors: Takeshi Kamizono, Nagoya (JP); Gang Xie, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 50 days.

(21) Appl. No.: 13/690,700

(22) Filed: Nov. 30, 2012

(65) Prior Publication Data
US 2013/0136982 A1      May 30, 2013

(30) Foreign Application Priority Data

Nov. 30, 2011   (JP) .................................. 2011-262215

(51) Int. Cl.
| | |
|---|---|
| *H01M 8/04* | (2006.01) |
| *H01M 4/46* | (2006.01) |
| *H01M 10/054* | (2010.01) |
| *H01M 10/056* | (2010.01) |
| *H01M 10/0568* | (2010.01) |
| *H01M 6/16* | (2006.01) |

(52) U.S. Cl.
CPC ............ *H01M 4/466* (2013.01); *H01M 10/054* (2013.01); *H01M 10/056* (2013.01); *H01M 10/0568* (2013.01); *H01M 6/16* (2013.01)
USPC ...................................... 429/188; 429/231.95

(58) Field of Classification Search
USPC .................................. 429/188, 218.1, 231.95
See application file for complete search history.

(56) References Cited

U.S. PATENT DOCUMENTS

| | | | | |
|---|---|---|---|---|
| 2,809,225 | A | * | 10/1957 | Morehouse et al. ........... 429/188 |
| 4,844,996 | A | * | 7/1989 | Peled et al. .................... 429/337 |
| 7,026,075 | B2 | | 4/2006 | Takami et al. |
| 2010/0310933 | A1 | * | 12/2010 | Jiang et al. ..................... 429/188 |

FOREIGN PATENT DOCUMENTS

| | | |
|---|---|---|
| JP | 2003-100347 | 4/2003 |
| JP | 2007-188694 | 7/2007 |
| JP | 2010-245072 | 10/2010 |

OTHER PUBLICATIONS

Nobuko Yoshimoto, et al., "Mixed electrolyte consisting of ethylmagnesiumbromide with ionic liquid for rechargeable magnesium electrode", Journal of Power Sources 195, 2010, pp. 2096-2098.

Katsuhiko Tsunashima, et al., "Physical and electrochemical properties of ionic liquids based on quaternary phosphonium cations (2)", Abstract of the Electrochemical Society of Japan, vol. 47, Mar. 29, 2007, p. 327.

* cited by examiner

*Primary Examiner* — Mark F Huff
*Assistant Examiner* — Monique Wills
(74) *Attorney, Agent, or Firm* — Oblon, Spivak, McClelland, Maier & Neustadt, L.L.P.

(57) ABSTRACT

An electrochemical device includes a positive electrode, a negative electrode, and a nonaqueous electrolytic solution, wherein the negative electrode contains a magnesium element, and wherein the nonaqueous electrolytic solution is one obtained after dipping metallic lithium for a predetermined time period.

4 Claims, 1 Drawing Sheet

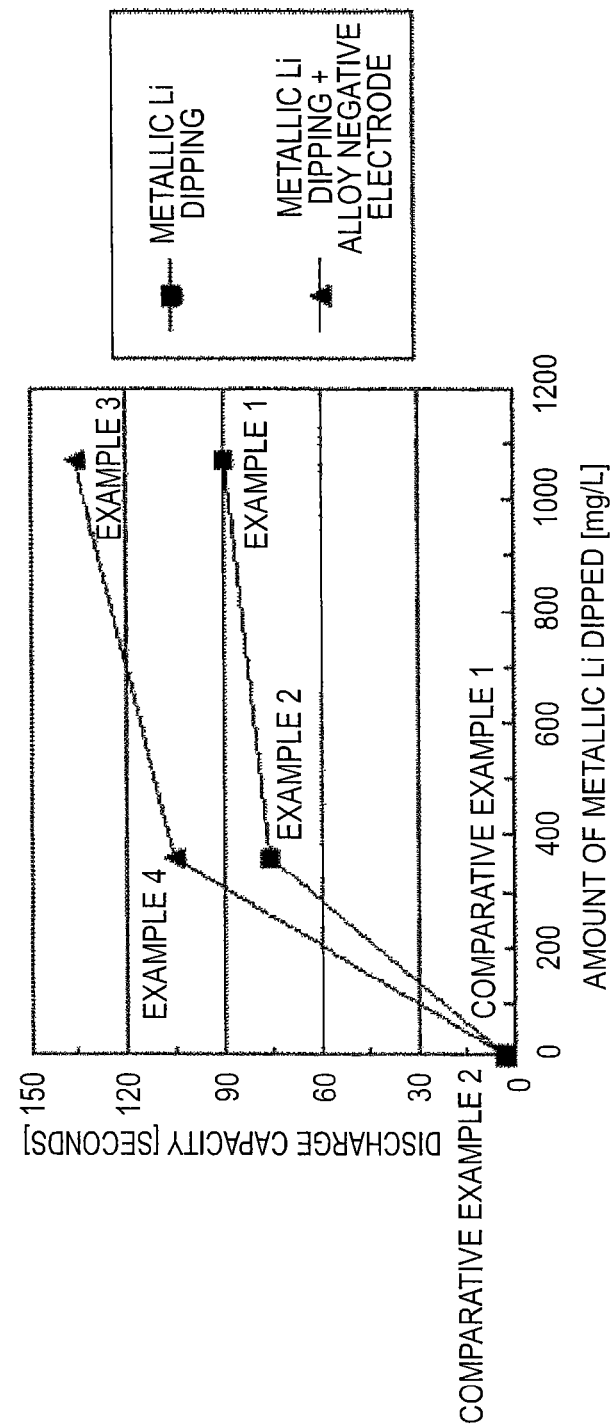

ELECTROCHEMICAL DEVICE USING MAGNESIUM ELEMENT-CONTAINING NEGATIVE ELECTRODE

CROSS-REFERENCE TO RELATED APPLICATION

This application is based on and claims priority under 35 U.S.C. §119 to Japanese Patent Application No. 2011-262215 filed on Nov. 30, 2011, the entire content of which is incorporated herein by reference.

TECHNICAL FIELD

This disclosure relates to electrochemical devices that use magnesium element-containing negative electrodes.

BACKGROUND DISCUSSION

Electrochemical devices such as primary batteries, secondary batteries, and electrochemical capacitors are installed in electrical devices. Such electrochemical devices are configured from components such as positive electrodes, negative electrodes, electrolytes, and separators.

The negative electrode, an essential constituting element of an electrochemical device, is preferably formed from substances that easily release electrons and provide cations. Metallic lithium is one example of the representative negative electrode materials currently in use in practical devices.

Meanwhile, in response to the recent demand for smaller and more functional electrical devices, there is a need to increase device capacity. One way to increase device capacity is to provide a negative electrode by using materials that release more electrons than does the metallic lithium, specifically substances that provide ions of higher valency than the lithium ions.

For example, JP 2007-188694A (Reference 1) proposes an electrochemical device in which metallic magnesium is used for the negative electrode. Generally, a passive coating that does not pass magnesium ions is formed on the negative electrode surface of the negative electrode active material metallic magnesium. In order to prevent formation of the passive coating, an electrolytic solution that contains alkyl aluminum is used in the electrochemical device. Specifically, the constituting elements of the electrochemical device include: a positive electrode that contains a cobalt(II) chloride active material; a metallic magnesium foil negative electrode; a polyethylene glycol separator; and an electrolytic solution that contains an ether solvent (tetrahydrofuran (THF), etc.), an electrolyte ($Mg(ClO_4)_2$, etc.) containing one or more magnesium salts, and alkyl aluminum (trimethylaluminum, etc.).

Further, a device is proposed in which a substance that does not easily form a passive coating on the negative electrode active material surface is used for the negative electrode. For example, JP 2003-100347A (Reference 2) discloses a nonaqueous electrolytic solution battery in which a magnesium alloy is used for the negative electrode. The constituting elements of the nonaqueous electrolytic solution battery include: a $Fe_2(SO_4)_3$ positive electrode; a negative electrode containing one or more calcium elements and magnesium elements; a separator using materials such as polyethylene and polypropylene; and an electrolytic solution that contains a carbonate solvent (γ-butyrolactone (GBL), etc.), an electrolyte ($Mg(ClO_4)_2$, etc.) containing one or more calcium salts and magnesium salts, and other salts (additives), specifically alkylsulfone (dipropyl sulfone, etc.).

The devices using the magnesium-containing negative electrodes have a number of advantages. For example, the production cost of metallic magnesium is much lower than the cost of producing metallic lithium. Accordingly, the devices using magnesium-containing negative electrodes are less expensive than using lithium.

However, the alkyl aluminum contained in the electrolytic solution of the electrochemical device disclosed in Reference 1 lacks stability.

Reference 2 fundamentally fails to sufficiently suppress the passive coating, and is not sufficient for practical applications.

SUMMARY

Thus, a need exists for an electrochemical device that allows the negative electrode active material to easily undergo dissolution and deposition, and that can increase discharge capacity, and with which these advantages can be exhibited even when the negative electrode active material is metallic magnesium.

According to a first aspect of this disclosure, there is provided an electrochemical device that includes a positive electrode, a negative electrode, and a nonaqueous electrolytic solution, wherein the negative electrode contains a magnesium element, and wherein the nonaqueous electrolytic solution is one obtained after dipping metallic lithium for a predetermined time period.

BRIEF DESCRIPTION OF THE DRAWINGS

FIG. 1 is a graph representing the relationship between the amount of the metallic lithium dipped into an electrolytic solution and device discharge capacity for the electrochemical devices produced in Examples and Comparative Examples disclosed here.

DETAILED DESCRIPTION

An embodiment disclosed here is described below.

The components of an electrochemical device disclosed here include a positive electrode, a negative electrode, a separator disposed between the positive electrode and the negative electrode, and an electrolytic solution, as with common electrochemical devices. Specifically, the electrochemical device disclosed here includes a positive electrode, a negative electrode, and a nonaqueous electrolytic solution, wherein the negative electrode contains a magnesium element, and wherein the nonaqueous electrolytic solution is one obtained after dipping metallic lithium for a predetermined time period.

The positive electrode forming the electrochemical device disclosed here may be one used in electrochemical devices of related art. For example, the positive electrode may be an electrode that enables transfer of the positive charge to and from the solution, specifically a magnesium oxide electrode capable of magnesium ion insertion and desorption, and an activated carbon electrode positively charged inside and capable of accumulating charges by electrostatically adsorbing the negative ions (anions) present in the electrolytic solution.

The negative electrode contains a magnesium element. For example, the negative electrode contains metallic magnesium as the negative electrode active material. The energy capacity of the negative electrode can be increased when the negative electrode is formed of simple metallic magnesium.

The negative electrode may also contain a negative electrode active material formed of a magnesium alloy.

The magnesium alloy is preferably a magnesium-calcium alloy that contains a calcium element. The content of the calcium element in the magnesium-calcium alloy is preferably 35.6 at % or less of the total magnesium-calcium alloy. With a calcium element content above 35.6 at % of the total magnesium-calcium alloy, a calcium metallic phase appears, and the reversible oxidation and reduction of the calcium metal will not be possible, with the result that the overall structure of the negative electrode cannot be maintained. Further, the negative electrode undergoes corrosive degradation, and the device durability suffers. The magnesium alloy may be a mixture of simple metallic magnesium and a magnesium-calcium alloy.

The separator disposed between the positive electrode and the negative electrode may be a separator used in electrochemical devices of related art, and that serves to prevent the contact shorting of the electrodes, and to mechanically provide a space for the electrolytic solution components upon containing the electrolytic solution. Examples include cellulose paper separators, and polyethylene or polypropylene resin separators.

The electrolytic solution is a nonaqueous electrolytic solution obtained by containing one or more magnesium salts in an organic solvent, and dipping metallic lithium therein for a predetermined time period.

The organic solvent may be one used in electrochemical devices of related art, provided that it can dissolve and dissociate the electrolyte. Examples include ester γ-butyrolactone, and ether tetrahydrofuran. The electrolyte may be one used in electrochemical devices of related art, provided that it does not react with the substances contained in the electrolytic solution. Examples include electrolytes containing one or more magnesium salts (such as magnesium perchlorate ($Mg(ClO_4)_2$), and magnesium bisimide ($Mg[N(SO_2CF_3)_2]_2$)).

It was confirmed by the present inventors that dipping the metallic lithium in the electrolytic solution for a predetermined time period facilitates the dissolution and deposition of the negative electrode active material because it increases the dissolution and deposition amounts from the metallic magnesium, and improves the discharge capacity of the electrochemical device, though the mechanism remains unclear.

The electrochemical device disclosed here is configured as a storage device, for example, such as a primary battery, a secondary battery, and an electrochemical capacitor.

EXAMPLES

The disclosure is described in greater detail below with reference to specific examples. It should be noted that the disclosure is in no way limited by the following descriptions.

Example 1

Preparation of Electrolytic Solution

Magnesium perchlorate ($Mg(ClO_4)_2$; Kishida Chemical Co., Ltd.; 3.12 g) was dissolved in 28 ml of cyclic ester (γ-butyrolactone (GBL); Kishida Chemical Co., Ltd.); water content: 50 ppm) after being heated and dried under vacuum at 100° C. for 9 hours. Then, metallic lithium (30 mg) was dipped in the solution for 5 days, and was removed to prepare an electrolytic solution (water content: 100 ppm).
Device Production and Device Discharge Capacity Measurement A cellulose substance (TF40; Nippon Kodoshi Corporation) was interposed as a separator between a positive electrode and a negative electrode. The positive electrode was prepared by punching an activated carbon-coated aluminum foil ("MDLC-105N2"; Hohsen Corp.) in φ15.5 mm. The negative electrode was prepared by punching a metallic magnesium foil in φ15.5 mm. The construct was assembled into a bipolar cell (HS cell; Hohsen Corp.) in an environment at a dew point of −30° C. or less. The electrolytic solution prepared as above was used as the electrolytic solution. This completed the electrochemical device disclosed here.

The electrolytic solution was permeated into the positive electrode and the negative electrode after vacuuming to 1 MPa and immediately bringing the pressure back to the atmospheric pressure. The device discharge capacity was measured by taking the discharge time value after 3 cycles of the charge and discharge performed with a battery charge and discharge device (HJ-201B; Hokuto Denko Corp.) under a charge current of 0.01 mA, a charge voltage of 3.2 V, a charge time of 30 min, a discharge current of 0.01 mA, and a lower limit voltage of 1.5 V.

FIG. 1 represents the discharge capacity measurement result for the device produced in Example 1. The discharge time of the device of Example 1 was 90 seconds.

Example 2

Preparation of Electrolytic Solution

An electrolytic solution was prepared in the same manner as in Example 1, except that the metallic lithium was used in 10 mg, instead of 30 mg.
Device production and Device Discharge Capacity Measurement A device was produced, and discharge capacity was measured in the same manner as in Example 1.

FIG. 1 represents the discharge capacity measurement result for the device produced in Example 2. The discharge time of the device of Example 2 was 76 seconds.

Example 3

Preparation of Electrolytic Solution

An electrolytic solution was prepared in the same manner as in Example 1.
Device Production and Device Discharge Capacity Measurement A device was produced, and discharge capacity was measured in the same manner as in Example 1, except that the negative electrode material was changed from the metallic magnesium foil to a magnesium-calcium alloy (Mg:Ca=70:30 (at %)). The magnesium-calcium alloy is a mixture of a Ca-Mg alloy and Mg.

FIG. 1 represents the discharge capacity measurement result for the device produced in Example 3. The discharge time of the device of Example 3 was 136 seconds.

Example 4

Preparation of Electrolytic Solution

An electrolytic solution was prepared in the same manner as in Example 2.
Device Production and Device Discharge Capacity Measurement A device was produced, and discharge capacity was measured in the same manner as in Example 3.

FIG. 1 represents the discharge capacity measurement result for the device produced in Example 4. The discharge time of the device of Example 4 was 106 seconds.

Comparative Example 1

Preparation of Electrolytic Solution

An electrolytic solution was prepared in the same manner as in Example 1, except that the dipping of metallic lithium was not performed.
Device Production and Device Discharge Capacity Measurement
A device was produced, and discharge capacity was measured in the same manner as in Example 1.

FIG. 1 represents the discharge capacity measurement result for the device produced in Comparative Example 1. The discharge time of the device of Comparative Example 1 was 3 seconds.

Comparative Example 2

Preparation of Electrolytic Solution

An electrolytic solution was prepared in the same manner as in Comparative Example 1.
Device Production and Device Discharge Capacity Measurement
A device was produced, and discharge capacity was measured in the same manner as in Example 3.

FIG. 1 represents the discharge capacity measurement result for the device produced in Comparative Example 2. The discharge time of the device of Comparative Example 2 was 3 seconds.

Comparative Example 3

Preparation of Electrolytic Solution

An electrolytic solution was prepared in the same manner as in Comparative Example 1.
Device Production and Device Discharge Capacity Measurement
A device was produced, and discharge capacity was measured in the same manner as in Example 1, except that the negative electrode material was changed from the metallic magnesium foil to a magnesium-calcium alloy (Mg:Ca=60:40 (at %)).

The negative electrode corroded in the course of the measurement, and failed to maintain its shape. Accordingly, the discharge time could not be measured.

Table 1 presents the negative electrode materials used in Examples 1 to 4 and Comparative Examples 1 to 3, and the dip amounts of the metallic lithium with respect to the electrolytic solution.

TABLE 1

|  | Negative electrode | Amount of metallic Li dipped (mg/L) |
|---|---|---|
| Ex. 1 | Metallic Mg | 1071 |
| Ex. 2 | Metallic Mg | 357 |
| Ex. 3 | Mg—Ca alloy (Mg:Ca = 70:30 (at %)) | 1071 |
| Ex. 4 | Mg—Ca alloy (Mg:Ca = 70:30 (at %)) | 357 |
| Com. Ex. 1 | Metallic Mg | 0 |
| Com. Ex. 2 | Mg—Ca alloy (Mg:Ca = 70:30 (at %)) | 0 |
| Com. Ex. 3 | Mg—Ca alloy (Mg:Ca = 60:40 (at %)) | 0 |

As demonstrated in the Examples and Comparative Examples above, it was possible to suppress formation of a passive coating on the surfaces of the metallic magnesium and the magnesium alloy used as the negative electrode active material, and to increase the dissolution and deposition amounts of the negative electrode active material in the devices that used the electrolytic solution prepared by dipping metallic lithium for a predetermined time period. It was therefore possible to improve the discharge capacity of the electrochemical device disclosed here.

According to a first aspect of this disclosure, there is provided an electrochemical device that includes a positive electrode, a negative electrode, and a nonaqueous electrolytic solution, wherein the negative electrode contains a magnesium element, and wherein the nonaqueous electrolytic solution is one obtained after dipping metallic lithium for a predetermined time period.

According to a second aspect of this disclosure, the negative electrode in the electrochemical device includes an active material that contains metallic magnesium or a magnesium alloy.

According to a third aspect of this disclosure, the magnesium alloy in the electrochemical device contains a calcium element.

According to a fourth aspect of this disclosure, the content of the calcium element in the electrochemical device is 35.6 at % or less of the total magnesium alloy.

According to a fifth aspect of this disclosure, the nonaqueous electrolytic solution in the electrochemical device contains one or more magnesium salts.

As described above, it was found that the electrochemical device disclosed here using a magnesium alloy as the negative electrode can allow the negative electrode active material to easily undergo dissolution and deposition, and can thus increase the device discharge capacity. It was also found that these effects can be exhibited also in the electrochemical device in which simple metallic magnesium is used as the negative electrode.

What is claimed is:
1. An electrochemical device comprising:
a positive electrode,
a negative electrode, and
a nonaqueous electrolytic solution comprising one or more magnesium salt and containing a dip amount of metallic lithium of at least 357 mg/l,
wherein the negative electrode contains a magnesium element, and
wherein the nonaqueous electrolytic solution is one obtained after dipping metallic lithium for a predetermined time period.
2. The electrochemical device according to claim 1, wherein the negative electrode includes an active material that contains metallic magnesium or a magnesium alloy.
3. The electrochemical device according to claim 2, wherein the magnesium alloy contains a calcium element.

4. The electrochemical device according to claim 3, wherein the content of the calcium element is 35.6 at % or less of the total magnesium alloy.

* * * * *